US011904237B2

(12) United States Patent
Bucher et al.

(10) Patent No.: US 11,904,237 B2
(45) Date of Patent: *Feb. 20, 2024

(54) ACTIONABLE PUSH NOTIFICATIONS FOR COMPUTER-IMPLEMENTED GAMES

(71) Applicant: Zynga Inc., San Francisco, CA (US)

(72) Inventors: Jason Bucher, San Francisco, CA (US); Troy Steinbauer, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/377,872

(22) Filed: Jul. 16, 2021

(65) Prior Publication Data

US 2021/0339126 A1    Nov. 4, 2021

Related U.S. Application Data

(63) Continuation of application No. 15/607,298, filed on May 26, 2017, now Pat. No. 11,083,958.

(60) Provisional application No. 62/342,604, filed on May 27, 2016.

(51) Int. Cl.
| | |
|---|---|
| *A63F 13/25* | (2014.01) |
| *A63F 13/30* | (2014.01) |
| *A63F 13/795* | (2014.01) |
| *A63F 13/40* | (2014.01) |
| *G06Q 50/00* | (2012.01) |
| *A63F 13/533* | (2014.01) |
| *A63F 13/335* | (2014.01) |
| *G06F 3/0482* | (2013.01) |
| *G06F 3/04817* | (2022.01) |

(52) U.S. Cl.
CPC .............. *A63F 13/25* (2014.09); *A63F 13/30* (2014.09); *A63F 13/335* (2014.09); *A63F 13/40* (2014.09); *A63F 13/533* (2014.09); *A63F 13/795* (2014.09); *G06Q 50/01* (2013.01); *G06F 3/0482* (2013.01); *G06F 3/04817* (2013.01)

(58) Field of Classification Search
CPC ........ A63F 13/25; A63F 13/30; A63F 13/335; A63F 13/40; A63F 13/533; A63F 13/795; G06Q 50/01
See application file for complete search history.

(56) References Cited

U.S. PATENT DOCUMENTS 11,244,408 B2 *   2/2022   Lenahan ................ G06Q 50/01

\* cited by examiner

*Primary Examiner* — Yingchuan Zhang
(74) *Attorney, Agent, or Firm* — Schwegman Lundberg & Woessner, P.A.

(57) ABSTRACT

A online gaming system provides for presentation on a user device of actionable game-related push notifications. The push notification is presented outside of a game interface and includes both contextual information about a particular game event and one or more action elements. Responsive to selection of a particular action element, a corresponding game-related action is performed with launching or switching to a game application for the game on the user device. Thus, the push notification mechanism provides for performance of a game-related action without receiving user input via a game-specific user interface provided by a corresponding game application executed by the user device.

18 Claims, 12 Drawing Sheets

ACTIONABLE PUSH NOTIFICATIONS FOR COMPUTER-IMPLEMENTED GAMES

CLAIM OF PRIORITY

This application is a continuation of U.S. patent application Ser. No. 15/607,298, filed May 26, 2017, now issued as U.S. Pat. No. 11,083,958, which claims the benefit of priority to U.S. Provisional Application Ser. No. 62/342,604, filed on May 27, 2016, each of which is incorporated herein by reference in its entirety.

BACKGROUND

Multi player online computer games often provide for gameplay in which user input for user-controlled gameplay actions is received via a game interface that is generated on a user device and that includes at least part of a gameboard. The gameboard can comprise a virtual world or some other imagined playing space in which a player controls one or more player characters (herein "character," "player character," or "PC") and/or virtual game objects. In other multi-player online computer games (such as card-based games, board games, and word games) gameplay is often performed and displayed without control or representation of any player characters.

Player characters can be considered in-game representations of the controlling player. As used herein, the terms "player," "user," "entity," and "friend" refers to the in-game player character controlled by that player, user, entity, or friend (as opposed to referring to the controlling player, user, entity, or friend), only when such an interpretation is indicated explicitly or by the relevant context.

Many online computer games are operated on or in co-operation with an online social networking system. Such an online social networking system allows both users and other parties to interact with the computer games directly, whether to play the games or to retrieve game- or user-related information. Internet users may maintain one or more accounts with various service providers, including, for example, online game management systems and online social networking systems. Online systems can typically be accessed via devices using browser clients (e.g., Firefox, Chrome, Internet Explorer). In some embodiments, a game interface for the computer-implemented game can instead or additionally comprise an augmented reality display or a virtual reality display.

In many computer games, there are various types of in-game assets that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include missions, tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

In many computer games, there are various types of in-game assets that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include missions, tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

The game display can display a representation of the gameboard. In this respect, the gameboard is to be understood as the in-game environment in which gameplay occurs. For example, the gameboard of a word game can be a grid of blocks populated with letters, the gameboard of a chess game would be a virtual representation of a chessboard, and in game such as Farmville the gameboard comprises a virtual in-game world or environment within which player-controlled player characters are movable to perform various in-game objects with respect to other characters and/or in-game objects located within the virtual world or environment. A game engine accepts inputs from the player, determines in-game actions, decides outcomes of events and typically presents the player with a game display in a game user interface on the user device, the game display typically including at least part of the gameboard.

The performance of gameplay actions, in-game social interaction with other players, in-game cooperation with players in a common guild or alliance, and other game-related actions are typically performed on a user device via user interaction with corresponding user interface elements forming part of the game user interface. Generation of the game user interface on a user device to permit such actions is typically achieved by launching or executing a corresponding game application on the user device.

BRIEF DESCRIPTION OF THE SEVERAL VIEWS OF THE DRAWINGS

Some embodiments are illustrated by way of example and not limitation in the figures of the accompanying drawings. To easily identify the discussion of any particular element or act, the most significant digit or digits in a reference number refer to the figure number in which that element is first introduced. In the drawings.

OVERVIEW

Figure 1:
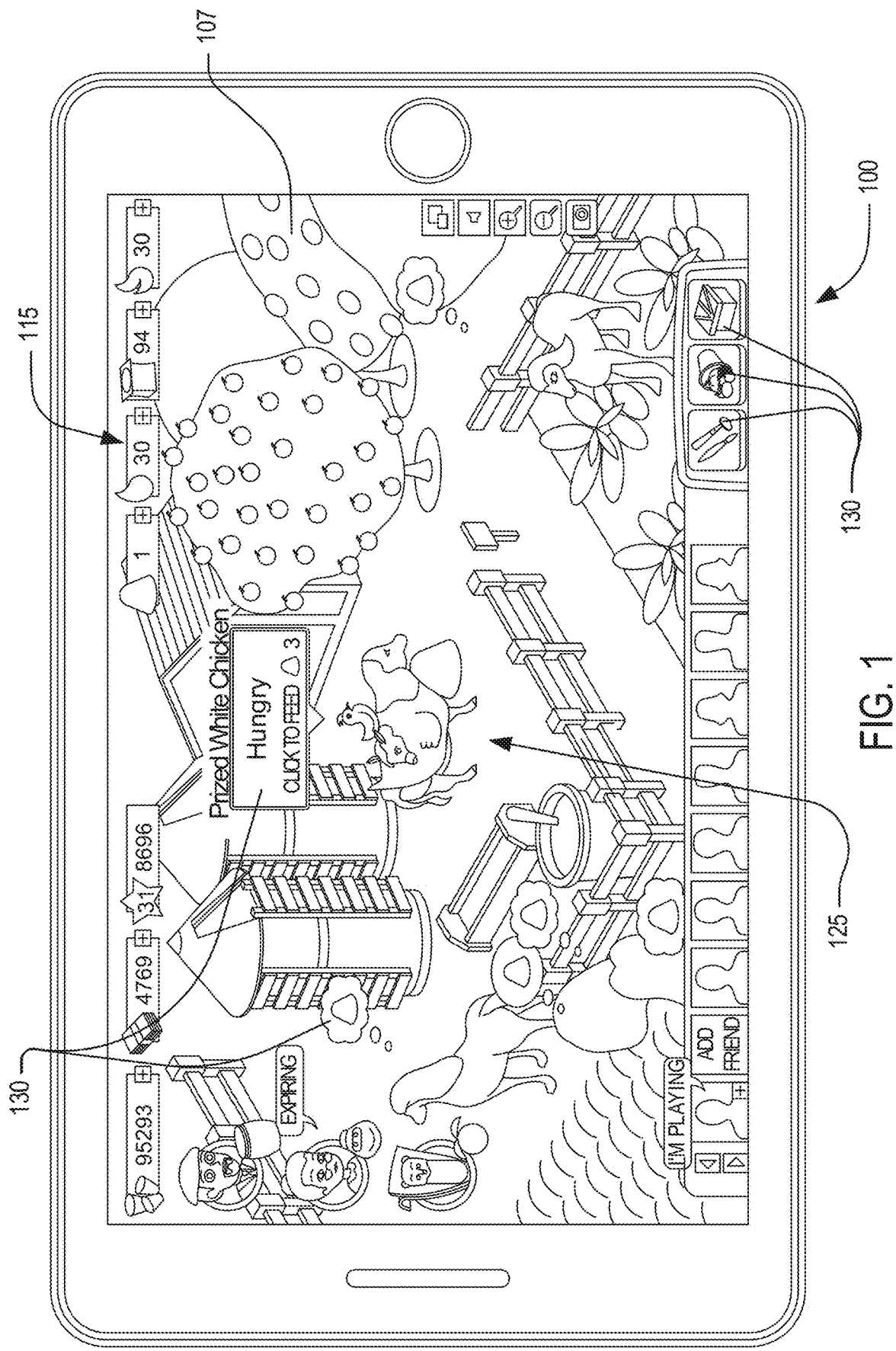
FIG. 1 is a stylized view of a mobile user device displaying a game user interface showing a game instance of a computer-implemented game, the game user interface being provided by a game application executing on the user device.

One aspect of the disclosure provides for a system for provision on a user device of actionable game-related push notifications with which a player can interact to cause performance of a game-related action without receiving user input via a game-specific user interface provided by a corresponding game application executed by the user device.

According to some example embodiments, the disclosure provides a method comprising:
  causing automatic presentation of a push notification about a computer implemented multiplayer online game on an electronic user device of a player of the game, presentation of the push notification being performed on the user device outside of a game application that is installed on the user device and that is executable to load a game instance of the game in a game user interface on the user device, the push notification comprising:
    contextual information indicating occurrence of an in-game event; and
    one or more action elements for respective user-initiated actions responsive to the in-game event, each action element being a user-selectable user interface element displayed as part of the push notification;
  receiving user input indicating user-selection of a particular one of the one or more action elements; and
  in an automated operation performed responsive to the user input indicating user-selection of the selected action element and using circuitry configured to perform the automated operation, causing performance of an in-game action corresponding to the selected action element without executing or switching to the game application on the user device.

The one or more action elements may comprise one of: a soft button carrying a respective action identifier, and an option icon displayed in association with a respective action identifier. In some example embodiments, the push notification comprises two or more action elements representing corresponding alternative options, so that no more than one of the one or more action elements can be selected responsive to presentation of the push notification on the user device. The two or more action elements may in some embodiments present a binary choice between two alternative user-initiated actions. Examples of such binary choices include alternative votes to be registered on a guild decision, alternative options to perform, the one hand, a particular social action, social assistance action, or gameplay action and, on the other hand, dismiss the push notification without performing the respective action. The method may in some embodiments comprise, responsive to user-selection of the selected action element, dismissing the push notification from display on the user device.

In some embodiments, the user device is a mobile electronic device, the presentation of the push notification comprising on-screen display of the push notification via a push notification functionality commonly employed by multiple different applications on the mobile electronic device. One example of such a push notification functionality employed by multiple different applications is a notification center on an iOS device. In some embodiments, the presentation of the push notification comprises display of the push notification on a lockscreen of the mobile electronic device.

The one or more action elements may in some embodiments present one or more social action elements for performing a corresponding social interaction between the player and another player of the game. In such cases, the one or more social action elements may include a comment element with respect to the in-game event indicated by the contextual information, the in-game action performed responsive to selection of the comment element comprising posting a user-provided comment to the game in association with the in-game event indicated by the contextual information of the push notification. The method may in such embodiments further comprise, responsive to user-selection of the comment element and before the posting of the comment:
  presenting a comment input interface on the user device in association with the push notification and outside of the game application; and
  receiving via the comment input interface user input indicating content of the comment to be posted in association with the indicated game event.

Instead, or in addition, the one or more social action elements may include a LIKE element with respect to the in-game event indicated by the contextual information, the in-game action performed responsive to selection of the LIKE element comprising posting a like notification from the user to the game in association with the in-game event indicated by the contextual information of the push notification.

In some embodiments, the one or more action elements present one or more social assistance elements for performing an in-game action in assistance to a particular player associated with the push notification and indicated by the contextual information. In such embodiments, the in-game action performed responsive to selection of a particular one of the one or more social assistance elements comprises performing the in-game action in assistance to the particular player.

In some such embodiments, the one or more social assistance elements may include a resource provision element for transferring in-game resources to the particular player associated with the push notification, the in-game action performed responsive to selection of the resource provision element comprising deducting a specified quantum of a specified resource from a game state of the player, and adding the specified quantum of the specified resource to a game state of the particular player associated with the push notification. The one or more action elements may in such embodiments consist of:

the resource provision element selectable to effect transfer of the specified resource; and a dismissal element selectable to cause dismissal of the push notification from display on the user device without effecting transfer of the specified resource.

In some embodiments, the one or more action elements may comprise a gameplay element selectable to trigger a corresponding in-game action in the form of a gameplay action performed with respect to a particular game instance associated with the player of the user device, without launching the game application or a separate game interface on the user device. In such embodiments, the gameplay action may comprise modification of a state or condition of a particular in-game object located in a virtual world of the particular game instance. The particular in-game object and a modified state or condition of the particular in-game object may in such cases be specified in the contextual information provided by the actionable push notification.

The modification of the state or condition of the particular in-game object may comprise activating or deactivating an in-game functionality of the particular in-game object. The gameplay action may in such instances comprise reactivating a countdown timer controlling periodic expiry of a corresponding gameplay functionality. Example embodiments of such gameplay actions may include activating an in-game object whose active status expires after a predefined period, selecting a harvesting element forming part of a harvest mechanic, or the like.

In some embodiments, the one or more action elements include a vote element that is selectable to register a vote for the player with respect to a collective issue indicated by the contextual information. In such embodiments, the collective issue indicated by the push notification and votable on by selection of the corresponding vote element may comprise a proposed collective activity for a guild or alliance of players of which the player associated with the user device forms part. An example of such a collective issue is a proposal to launch a guild action against a rival guild at a specified future time.

The disclosure further provides a system configured for automated performance of the disclosed method(s), and to a machine-readable storage medium having stored thereon instructions for causing a machine to perform the disclosed method(s).

DETAILED DESCRIPTION

An example embodiment of a method for providing actionable push notifications for a computer-implemented multiplayer online game will now be described in greater detail with reference to FIGS. 1-6. The example embodiment will be described with reference to provision of actionable push notifications a mobile electronic device in the example form of a mobile phone 100. The phone 100 is a user device associated with a specific user who is a player of a multiplayer online game playable by use of the phone 100. It will be appreciated that the disclosed techniques may in other embodiments be provided on the user device different from the phone 100.

In conventional fashion, the phone 100 has stored thereon multiple applications that are executable to provide respective functionalities. One of these applications is a game application that can be executed by a computer processor of the phone 100 to enable gameplay by use of the phone 100. When thus executed, the game application causes full-screen display of game user interface in the example form of game UI 115 on a touchscreen 107 of the phone 100. In this example embodiment, the game UI 115 is for the game Farmville™ provided by Zynga Inc., but it will be appreciated that each separate game will have a respective game user interface. The game UI 115 provides a game view showing at least part of a game instance uniquely associated with the player associated with the mobile phone 100.

In this example embodiment, the game instance 125 comprises a gameboard that defines a virtual world in the form of a virtual farm specific to the player. Gameplay within the virtual world defined by the game instance 125 comprises various gameplay actions that can be performed by the player through haptic selection of a corresponding game UI element 130. Only a few of multiple game UI elements 130 with respective functionalities are explicitly indicated in FIG. 1. As will be described in greater detail later, in-game actions that can be performed by the player include gameplay actions (e.g., interacting with a virtual in-game object in the game instance 125, such as clicking on an animal object to feed an associated animal), social actions (e.g. commenting on a communication or in-game event of a friend player, or liking a status update or event notification of a friend player), and group interactions with respect to a formal group of players (such as a guild or an alliance) of which the player forms part (e.g., voting on a proposed collective action, management of membership of the group, or the like). Typically, performance of such in-game actions by use of the phone 100 can be achieved only by launching the game application to access the game UI 115.

FIGS. 2-5 show a number of example push notifications delivered to the mobile phone 100 in accordance with an example embodiment. Although the example push applications are with respect to a game different from the example of FIG. 1 (i.e., Mafia Wars push notifications as opposed to the Farmville example of FIG. 1) the same reference numerals as in FIG. 1 is used for ease and clarity of description with respect to the various Mafia Wars elements corresponding those elements illustrated in FIG. 1. For the purposes of this description, the differences between Mafia Wars and Farmville is inessential as it relates to many features of actionable push notifications disclosed herein. Therefore, reference to elements such as the game UI 115, game instance 125, etc., and the description that follows can be read as referring to the corresponding elements of a Mafia wars game instance. In Mafia Wars the players play as gangsters building their own mafia. The players fight other players online, "rob" other players, and complete jobs, missions, and operations to gain rewards and strength in the endless game.

Figure 2:
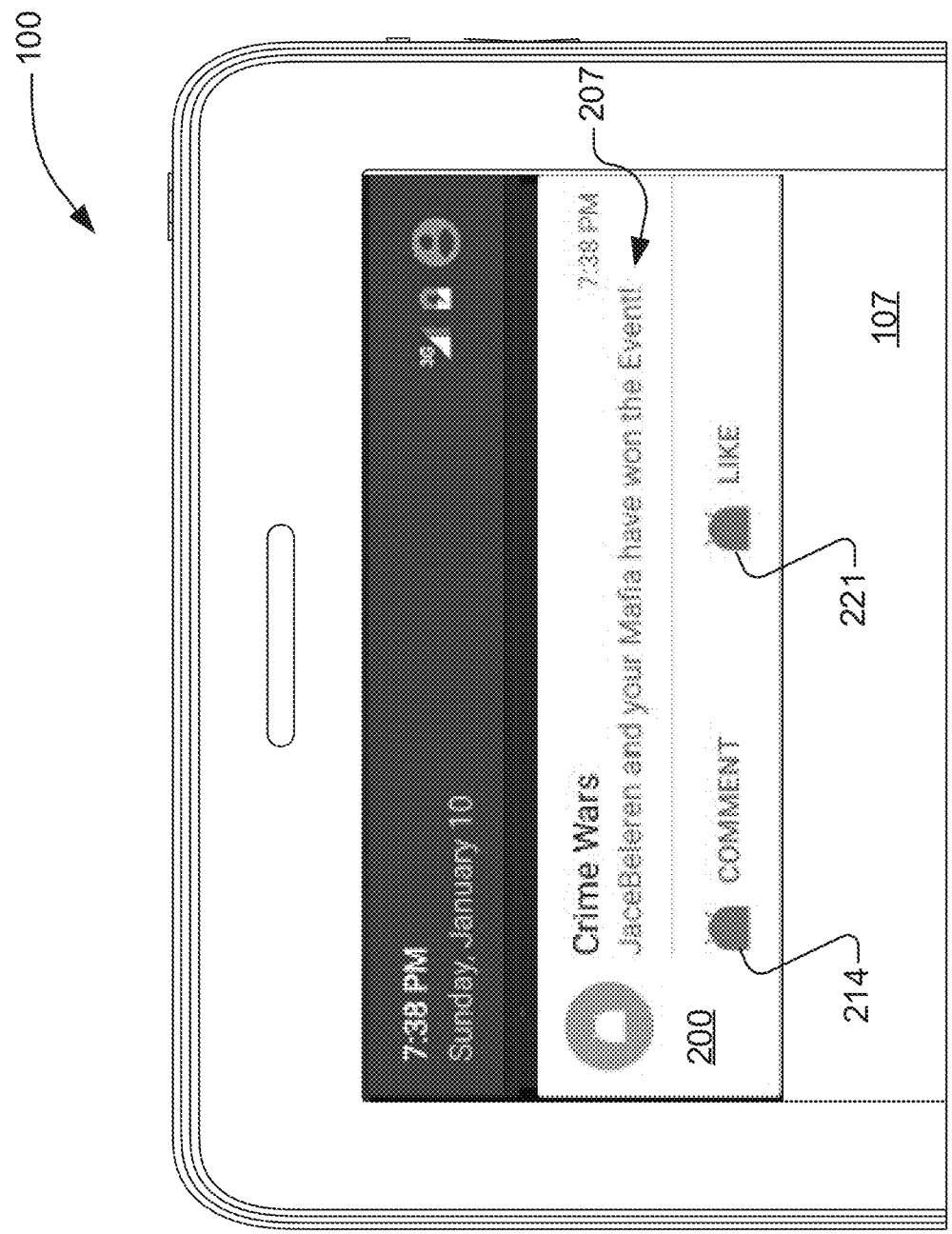
FIG. 2 is a diagrammatic view of an actionable push notification provided on a mobile user device for enabling a user to trigger a game-related social action via the notification.

FIG. 2 shows an example embodiment of an actionable game-related push notification 200 presented on the mobile phone 100 outside of the game 115 to enable the player to perform an in-game action without launching the corresponding game application on the phone 100. In the example embodiment of FIG. 2, the push notification 200 is configured to allow a user-initiated social action with respect to a particular in-game event to which the push notification 200 pertains.

The push notification 200 includes contextual information in the example form of notification text 207 reporting the occurrence of a particular in-game event resulting from gameplay by one or more associated friend players or groups. In this example embodiment, the notification text indicates that a particular friend player and a player guild of which the player who receives the push notification 200 is a member has won of a specified event.

The push notification 200 further includes one or more action elements that provide respective user interface elements selectable by the player to trigger corresponding in-game actions. In this example embodiment, the action elements are social action elements to trigger corresponding social actions in which the player interacts with other players via the game. Here, the social action elements include a comment element in the example form of a comment icon 214 and a like element in the example form of a like icon 221. As can be seen in FIG. 2, each of the action elements comprises a selectable on-screen object displayed in close association with a respective action indicator. In other embodiments, the action elements may be provided by respective soft buttons carrying the corresponding action identifiers.

Note that the push notification 200 is displayed outside of the game application, and therefore does not form part of the game UI 115. The push notification 200 can thus be displayed on the phone 100 without launching the game application. In this example embodiment, the push notification 200 is displayed by means of a notification application provided by native operating software of the mobile phone 100, e.g., a notification center functionality on a phone running iOS. The notification application in this instance permits automated display of push notifications while the phone 100 is a locked mode, so that the push notification 200 is displayed on a lockscreen of the mobile phone 100.

Instead or in addition, the push notification 200 may be accessible in substantially identical form in a notification center that may, for example, be accessible by swiping from a particular edge of the touchscreen 107. Thus, in a phone running iOS 10, push notifications 200 are surfaced on-screen in association with an alert beep and/or LED flash. If no action is taken on the push notification 200, it remains accessible by haptic swipe downwards from a top edge of the screen. Such a down-swipe action by the user causes scrolling on to the screen of any push notifications 200 on which no action has yet been taken. The user can in this manner see any outstanding push notifications 200 from the game, and can perform selected in-game actions via selection of the corresponding action elements in one or more of the push notifications 200 thus surfaced.

Returning now to the push notification 200 of FIG. 2, in response to user-selection of either the comment icon 214 or the like icon 221, a corresponding one of the alternative social actions is automatically performed with respect to the specified game event. Thus, if the user selects the comment icon 214, a comment input interface (e.g., a text box) may automatically be displayed as part of the push notification 200. The player can then enter the text of the particular comment that is to be posted with respect to the game event. Upon completion of the text input, the player indicates that the comment is to be sent (e.g., by pressing enter/return or by selecting a "done" soft button forming part of the comment input interface), upon which the user-provided comment is automatically posted for display within the game. Likewise, if the player selects the like icon 221, the "like" indication from the player is automatically recorded and may be displayed in the game interfaces of currently online players.

In this example embodiment, automatic performance of the selected social action (or of any one of the different user-initiated in-game actions triggered from the push notification 200, as described below) is achieved by communication of the selected action from the phone 100 to an online game engine (examples of which are discussed below with reference to example game architectures), which then implements the user-initiated action. In this manner, the relevant player performs a social action within the game, visible to other players logged in to the game in real-time, without having launched the game application or interacted with any user interface elements forming part of the game UI 115.

Figure 3:
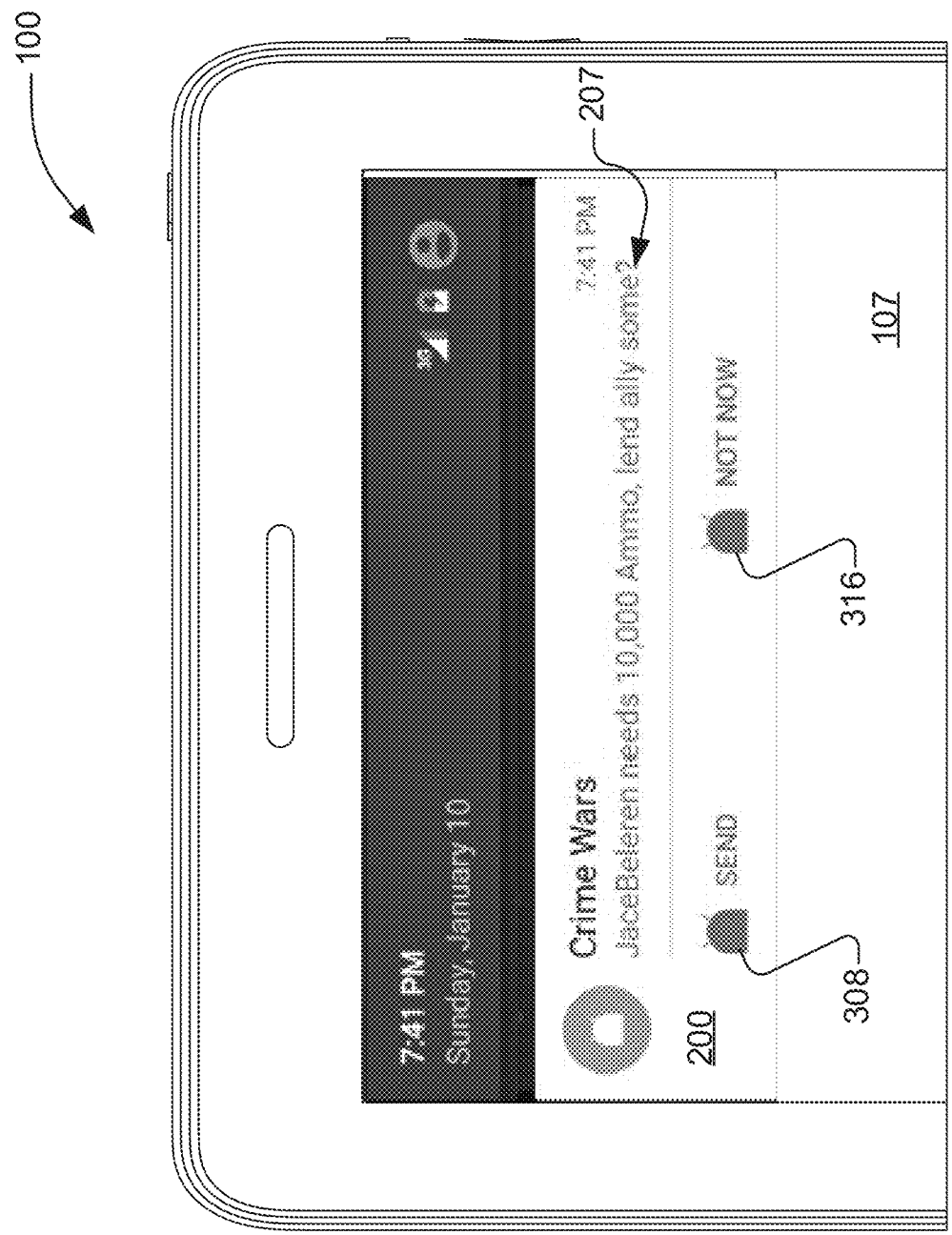
FIG. 3 is a diagrammatic view of an actionable push notification provided on a mobile user device for enabling a user to trigger provision of social assistance to another player of a computer-implemented via the notification.

FIG. 3 shows another example embodiment of an actionable game-related push notification, in this instance being a social assistance notification 300. The social assistance notification 300 functions in a manner similar to that described above with reference to the push notification 200 of FIG. 2, with a number of differences between the example notifications being noted below.

The social assistance notification 300 of FIG. 3 has notification text 207 that indicates a requester prompt for providing in-game social assistance to a friend player or a fellow guild- or alliance member. In this example, the requested social assistance is to transfer a specified quantum or amount of a specified resource to a particular player. Here, the lending of an amount of 10,000 Ammo is requested. The social assistance notification 300 further includes two alternative user-selectable social assistance elements in the form of a send icon 308 and a dismissal icon 316, providing a binary choice of actions.

The send icon 308 is a resource provision element selectable by the user to automatically trigger sending of the requested resources to the player indicated by the notification text 207. In contrast, the dismissal icon 316 is a dismissal element selectable by the user to dismiss the social assistance notification 300 from display without transferring the requested resources.

Figure 4:
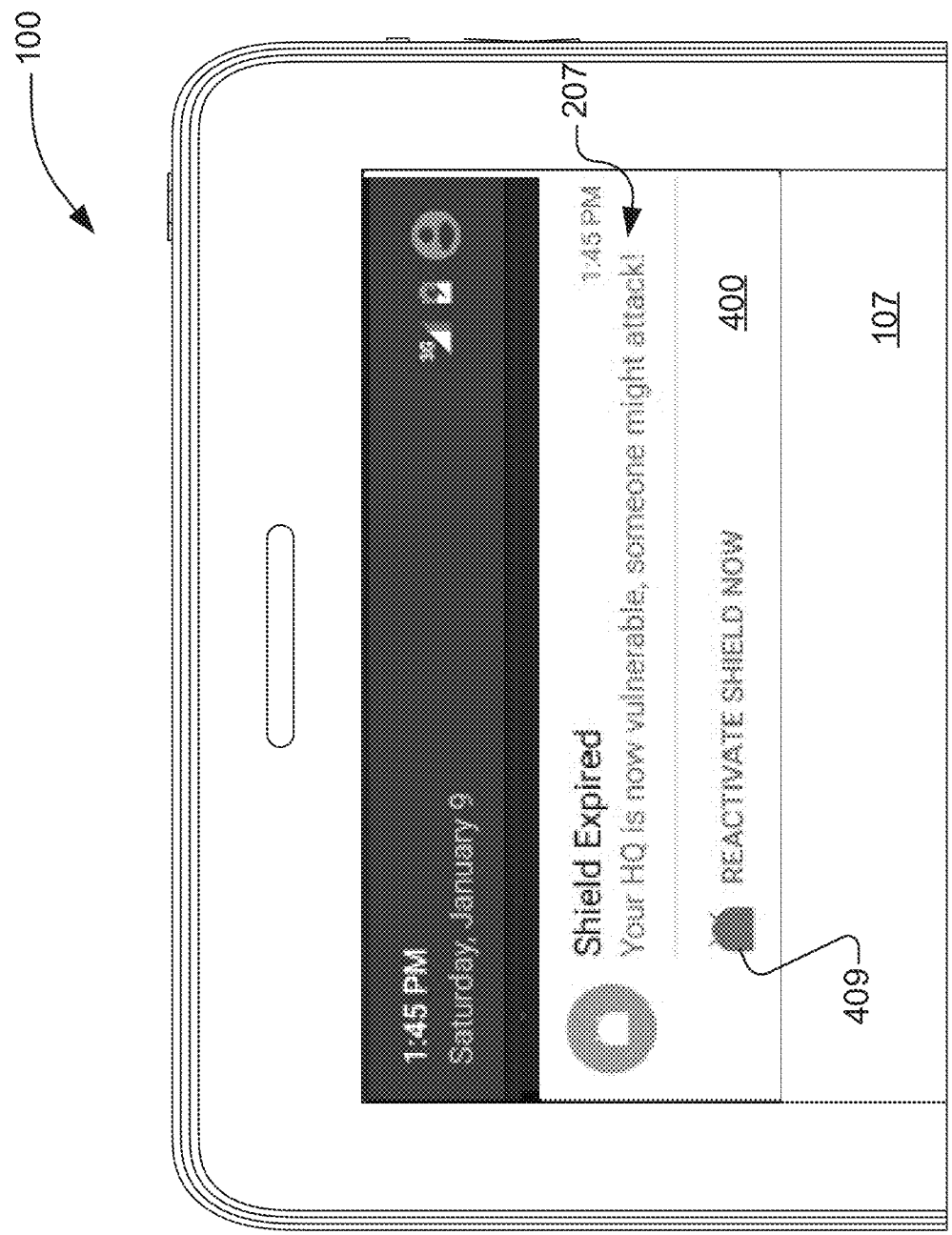
FIG. 4 is a diagrammatic view of an actionable push notification provided on a mobile user device for enabling a user to trigger a gameplay action in a computer-implemented game via the notification.

FIG. 4 shows yet another example embodiment of a push notification according to the disclosure, in this instance being a gameplay prompt notification 400 which is actionable to trigger performance of a particular gameplay action with respect to the particular game instance associated with the player of the phone 100. In this example, the gameplay prompt notification 400 displays notification text 207 that notifies the player that a countdown timer operating with respect to an associated in-game object or functionality has expired. Here, a periodically re-activatable shield in the player's game instance has expired. In other example embodiments, the gameplay prompt notification 400 may relate to different in-game objects or functionalities, such as, for example, a harvest mechanic that allows periodic selection of an in-game object to gather resources or other benefits for the player. In the harvest mechanic example, harvesting of particular resource in the player's game instance of a Farmville-type game may come due or ripe while the player is not directly playing the game via the associated game application or browser interface. In such cases, the game system may then cause transmission of a gameplay prompt notification 400 that prompts and enables the player to perform the due action even while the player is not actively logged in to the game (being, in gaming parlance, away from keyboard).

The gameplay prompt notification 400 includes a user-selectable gameplay element in the example form of a gameplay action icon 409. In this example embodiment, the gameplay prompt notification 400 includes only the single illustrated gameplay action icon 409, but in other embodiments, a similar notification may include one or more additional alternative icons or soft buttons. Upon user-selection of the gameplay action icon 409, the user input is communicated to the game engine, which automatically reactivates the expired shield. It will be appreciated that activation of the shield thus causes modification of a state or condition of a particular in-game object (here, the previously expired shield) in the virtual world of the particular game instance, without launching the corresponding game 115 on the mobile phone 100. In this instance, the state of the specific shield is modified from an inactive state to an active state.

It will be appreciated that actionable push notifications for gameplay actions according to this disclosure is not limited to reactivating a countdown timer controlling periodic expiry of a corresponding gameplay functionality (as is the case with the example embodiment of FIG. 4), but that different types of gameplay actions can in other embodiments be triggered by user-selection of a corresponding gameplay element presented by an actionable push notification.

Figure 5:
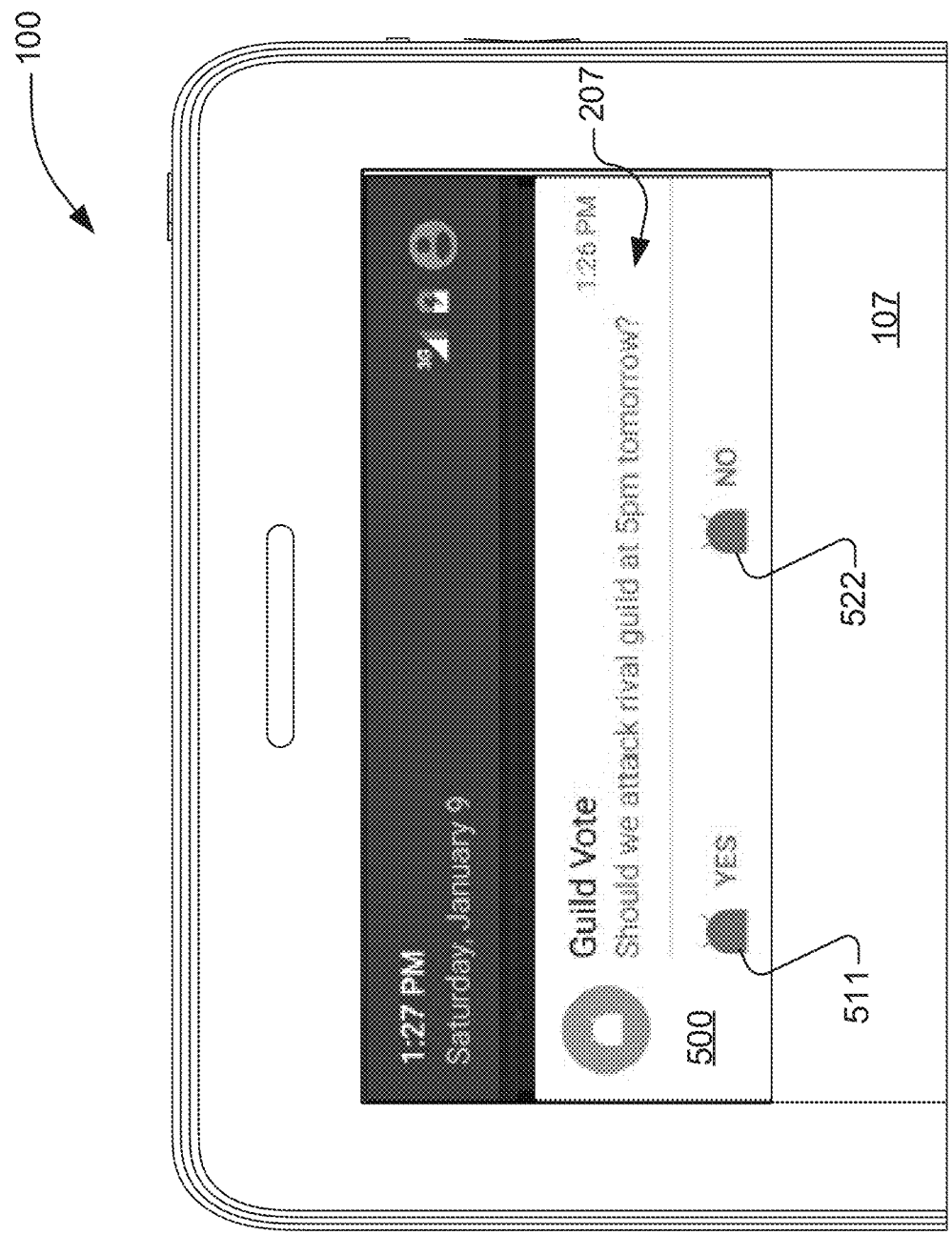
FIG. 5 is a diagrammatic view of an actionable push notification provided on a mobile user device for enabling a user to trigger registration of a particular vote for the user with respect to a specified guild- or alliance issue via the notification.

FIG. 5 shows a further example embodiment of a push notification in the form of a vote notification 500 pertaining to a vote to be taken by a formally structured group of players of which the player associated with the phone 100 forms part. In this example embodiment, the player forms part of a guild of players in a game (here, MAFIA WARS™) in which rival guilds compete against each other. The contextual information provided by the notification text 207 indicates a proposed collective activity for the guilt, on which a vote is sought from the player. In the particular example notification 500 of FIG. 5, the collective issue to be voted on is whether or not a rival guild is to be attacked at a specified future time.

The vote notification 500 includes a binary alternative pair of vote elements in the example form of a YES button 511 and a NO button 522. Selection of the YES button 511 or the NO button 522 by the player causes substantially real-time registration of a corresponding vote, without requiring any further action by the player and without launching the corresponding game application on the mobile phone 100.

Figure 6A:
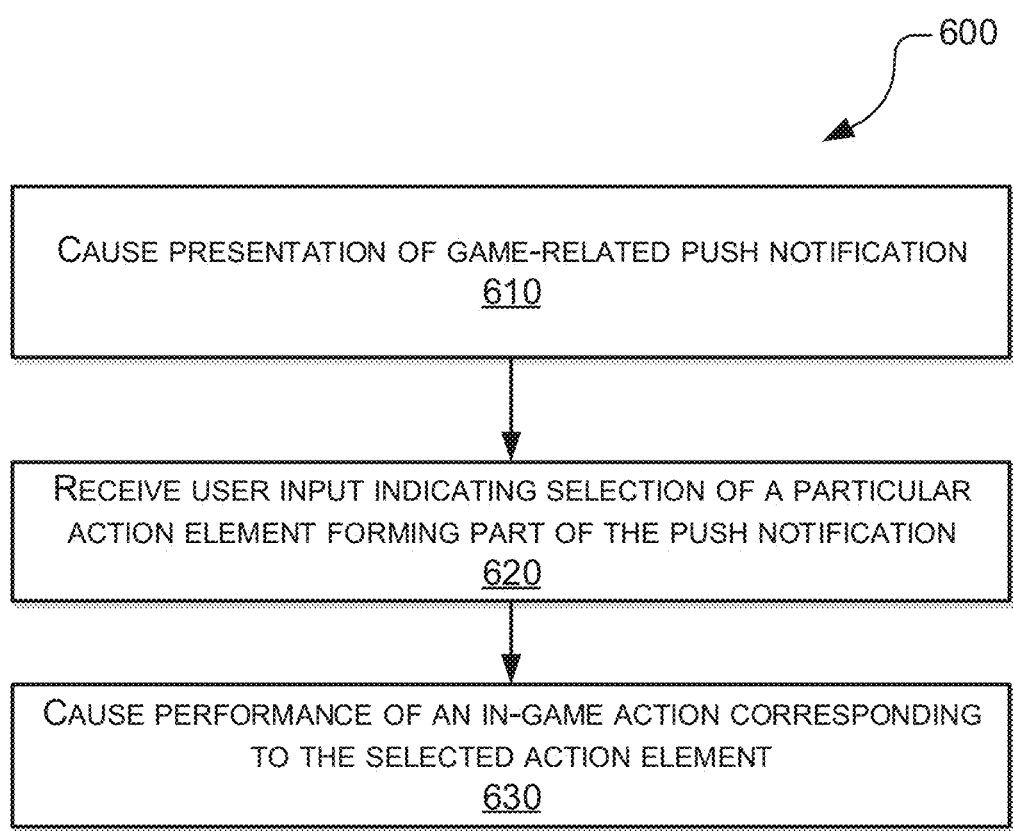
FIGS. 6A and 6B are, respectively, a high level schematic flow diagram and a more detailed schematic flow diagram of a method of facilitating performance of game-related actions by a player of a computer-implemented game, according to some example embodiments.

Turning now to FIG. 6A, therein is shown a high-level flowchart of a method 600 for automated provision of game related actionable push notifications accordance with an example embodiment. In some example embodiments, the method 600 is performed by client-side components provided in this example embodiment by the mobile phone 100. In other example embodiments, the operations of method 600 can be performed by server-side components.

The method 600 comprises, at operation 610, causing the presentation of a game related push notification (such as, for example of the respective push notifications discussed with reference to FIGS. 1-6). At operation 620, user input indicating selection of a particular action element forming part of the push notification 200 is received. The method 600 further comprises causing performance, at operation 630, of game-related action corresponding to the selected action element, as discussed by way of example with reference to FIGS. 1-6.

Figure 6B:
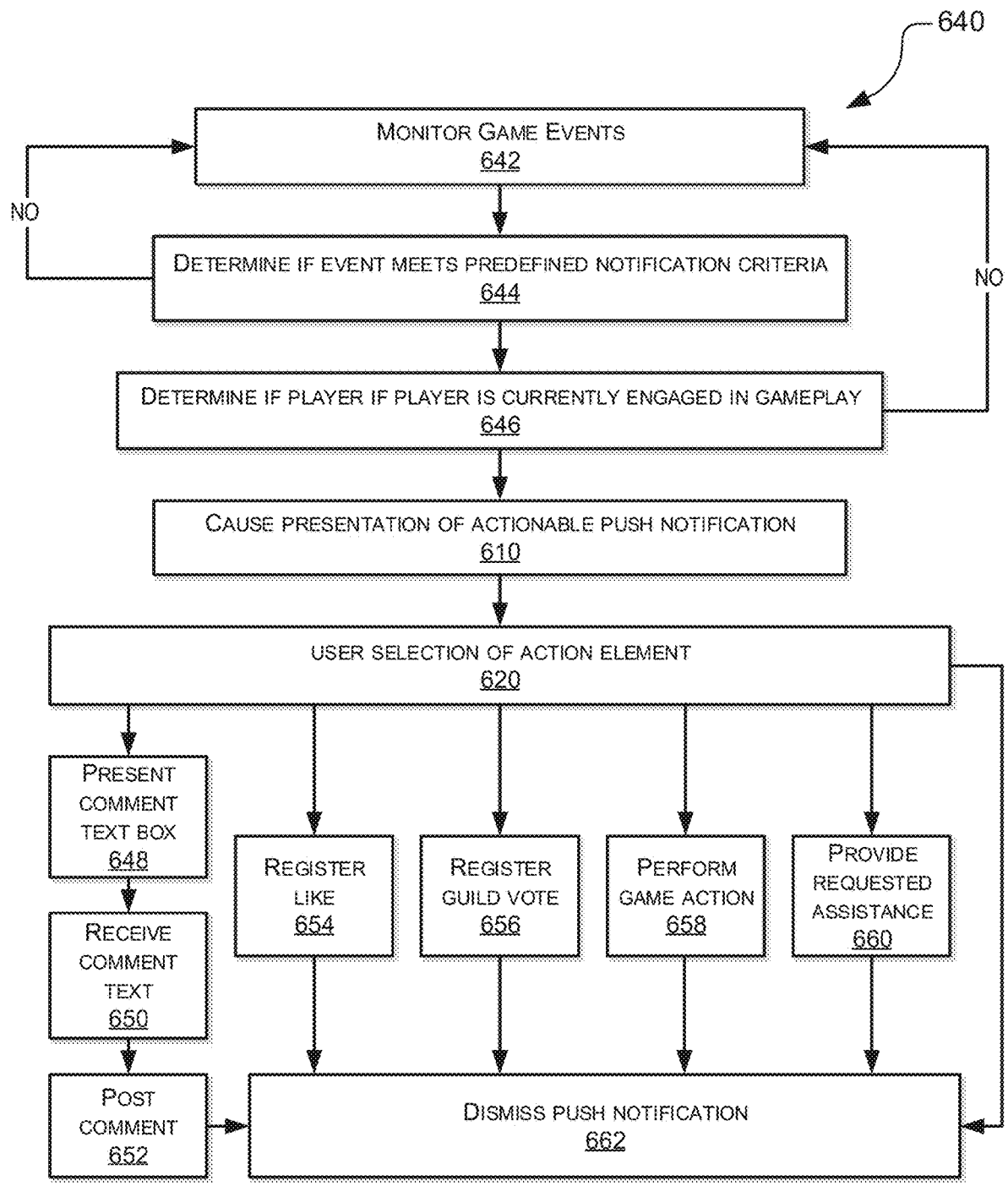

FIG. 6B shows a more detailed flow chart of a method 640 for automated provision of actionable game related push notifications in accordance with an example embodiment. At operation 642, a notification engine forming part of the gaming system monitors gameplay, and, in particular, monitors the occurrence of game events. The notification engine automatically determines for each game event, at operation 644, whether or not the game event satisfies predefined notification criteria.

The predefined notification criteria specify the conditions responsive to which push notifications are to be produced for different game events. In one example embodiment, default notification criteria are applied, meaning that the same criteria are used equally for all players. In other embodiments, notification criteria may be customizable, allowing players to specify the particular game event types and/or corresponding requirements that are necessary to cause the production of a push notification 200. For example, the predefined notification criteria may specify that players in a guild are to receive push notifications when a collective issue is put to the vote within the game.

Thereafter, the notification engine determines, at operation 646, whether or not the player or players that are to receive any actionable push notification 200 with respect to a game event that satisfies the notification criteria are currently engaged in gameplay. Worded differently, it is determined whether or not the relevant players are logged in to the game. In this embodiment, players who are currently engaged in gameplay within the relevant game do not receive actionable push notifications for that game. This is to avoid interruption of gameplay, and also to avoid redundant notifications, considering that the player can be expected to be apprised of the relevant information within the game user interface. In other embodiments, however, push notifications may be presented to all targeted players, regardless of whether or not they are currently playing the game.

Operation 610 comprises presentation of an actionable push notification 200 to each targeted player not presently playing the game, similar to the corresponding operation described in FIG. 6A. Operation 620 similarly comprises the receiving of user input indicating selection of a particular action element forming part of the push notification 200, similar to the corresponding operation described in FIG. 6A.

FIG. 6B further shows a number of alternative actions performed by the system responsive to receiving user selection of the particular action item. If the user selects a comment icon 214 (FIG. 2), a comment text box is presented onscreen, at operation 648. Text input by the user is thereafter received in the text box, at operation 650, and a background action mechanism forming part of the system thereafter causes posting of the comment, at operation 652, such that it is visible from within the game. Thereafter, the push notification 200 is dismissed, at operation 662.

If the user selects a like icon 221 (FIG. 2), a like or thumbs-up by the player is registered within the game, at operation 654. If the push notification relates to a vote on a collective issue (e.g., as exemplified in FIG. 5), the particular vote for the guild action is registered, at operation 656. If the push notification 200 relates to performance of a game action (e.g., as exemplified in FIG. 4), selection of the game action item 409 causes performance of the game action, at operation 658, by the background action engine. If the push notification 200 relates to request for assistance e.g., as exemplified in FIG. 3), selection of the assistance icon 308 causes automated provision of the request assistance to the other player, at operation 660, while selection of the dismissal icon 316 causes dismissal of the push notification, at operation 662, without provision of the requested assistance.

It is a benefit of the above-disclosed techniques that it enables and facilitates timely performance of game-related actions, with lesser device computational load and user effort than is the case with conventional game architectures. Thus, the player can in some instance perform specific game actions with a single click responsive to a push notification, without ever launching a separate application for the relevant game. Some embodiments therefore allow for player engagement with gameplay and social channels with minimal friction, thus minimizing interactive friction by reducing the number of operations required from a player to perform a game play or social action promotes player involvement and therefore player retention.

Additionally, performing game actions via push notification reduces computational load on the user device, considering that application launch and execution is avoided. This mechanism also lessens user wait time during application launch, reduces opportunities for frustrating A further benefit is that surfacing actionable push notifications for an online game provides for meaningful notifications with measurable side effects. For example, limiting push notifications to the player to actionable push notifications having respective defined player-selectable actions serves to mitigate notification clutter and prevents perception by the user that notifications from the game are spam-type communications that are habitually ignored.

Example Architecture of Social Network Systems and Game Management Systems

Example systems, architectures, and hardware components that may be employed in provision of the functionalities discussed above with reference to FIGS. 1-6 are briefly discussed below.

Figure 7:
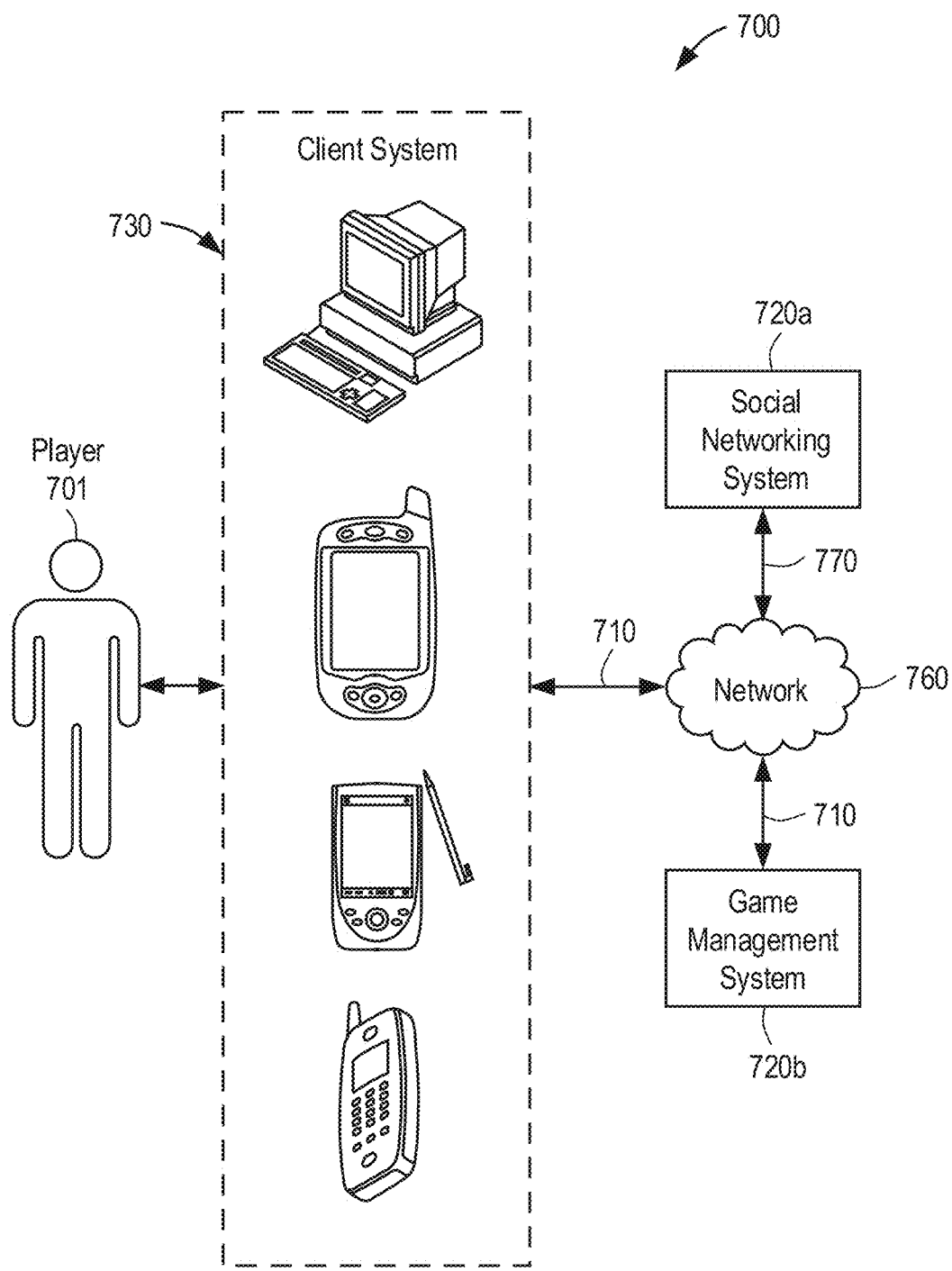
FIG. 7 is a schematic diagram showing an example of a system, according to some example embodiments.

FIG. 7 illustrates an example of a system for implementing various disclosed embodiments. In particular embodiments, system 700 for enabling online gameplay by player 701 comprises social networking system 720a, game management system 720b (i.e, online gaming system), client system 730 (of which the example mobile phone 100 of FIGS. may be one embodiment), and network 760. The components of system 700 can be connected to each other in any suitable configuration, using any suitable type of connection. The components may be connected directly or over the network 760, which may be any suitable network. For example, one or more portions of network 760 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 720a (i.e. social network system) is a network-addressable computing system that can host one or more social graphs. Social networking system 720a can generate, store, receive, and transmit social networking data. Social networking system 720a can be accessed by the other components of system 700 either directly or via network 760.

Game management system 720b is a network-addressable computing system that can host one or more online games. The game management system 720b can thus in some embodiments have multiple game engines and multiple game state databases for multiple respective games. Game management system 720b can generate, store, receive, and transmit game-related data, such as, for example, game account data, game input, game state data, and game displays. Game management system 720b can be accessed by the other components of system 700 either directly or via network 760. Player 701 may use client system 730 to access, send data to, and receive data from social networking system 720a and game management system 720b. Client system 730 can access social networking system 720a or game management system 720b directly, via network 760, or via a third-party system. As an example and not by way of limitation, client system 730 may access game management system 7201) via social networking system 720a. Client system 730 can be any suitable computing device, such as a personal computer, laptop, cellular phone, smart phone, computing tablet, etc.

Although FIG. 7 illustrates a particular number of players 701, social network systems 720a, game management systems 720b, client systems 730, and networks 760, this disclosure contemplates any suitable number of players 701, social network systems 720a, game management systems 720b, client systems 730, and networks 760. As an example and not by way of limitation, system 700 may include one or more game management systems 720b and no social networking systems 720a. As another example and not by way of limitation, system 700 may include a system that comprises both social networking system 720a and game management system 720b. Moreover, although FIG. 7 illustrates a particular arrangement of social networking system 720a, game management system 720, client system 730, and network 760, this disclosure contemplates any suitable arrangement of player 701, social networking system 720a, game management system 720b, client system 730, and network 760.

The components of system 700 may be connected to each other using any suitable connections 710. For example, suitable connections 710 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 710 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 710 need not necessarily be the same throughout system 700. One or more first connections 710 may differ in one or more respects from one or more second connections 710. Although FIG. 7 illustrates particular connections between player 701, social networking system 720a, game management system 720b, client system 730, and network 760, this disclosure contemplates any suitable connections between player 701, social networking system 720a, game management system 720b, client system 730, and network 760. As an example and not by way of limitation, in particular embodiments, client system 730 may have a direct connection to social networking system 720a or game management system 720b, bypassing network 760, Game Management Systems In an online computer game, a game engine manages the game state of the game. In the example embodiment of FIG. 7, the game engine may form part of the game management system 720b. Game state comprises all game play parameters, including player character state, non-player character (NW) state, in-game object state, game world state (e.g., internal game clocks, game environment), and other game play parameters. Each player 701 may control one or more player characters (PCs). The game engine controls all other aspects of the game, including non-player characters (NPCs), and in-game objects. The game engine also manages game state, including player character state for currently active (online) and inactive (offline) players.

An online game can be hosted by game management system 720b (i.e. online gaming system), which in this example embodiment includes an actionable notification system 904 (as illustrated in and described below with reference to FIG. 9) that performs operations according to embodiments as described herein. The game management system 720b can be accessed using any suitable connection with a suitable client system 730. A player may have a game account on game management system 720b, wherein the game account can contain a variety of information associated with the player the player's personal information, financial information, purchase history, player character state, game state). In some embodiments, a player may play multiple games on game management system 720b, which may maintain a single game account for the player with respect to all the games, or multiple individual game accounts for each game with respect to the player. In some embodiments, game management system 720b can assign a unique identifier to each player 701 of an online game hosted on game management system 720b. Game management system 720b can determine that a player 701 is accessing the online game by reading the user's cookies, which may be appended to HTTP requests transmitted by client system 730, and/or by the player 701 logging onto the online game.

In particular embodiments, player 701 may access an online game and control the game's progress via client system 730 (e.g., by inputting commands to the game at the client device). Client system 730 can display the game interface and any push notifications, receive inputs from player 701, transmitting user inputs or other events to the game engine, and receive instructions from the game engine. The game engine can be executed on any suitable system (such as, for example, client system 730, social networking system 720a, or game management system 720b). As an example and not by way of limitation, client system 730 can download client components of an online game, which are executed locally, while a remote game server, such as game management system 720b, provides backend support for the client components and may be responsible for maintaining application data of the game, processing the inputs from the player, updating and/or synchronizing the game state based on the game logic and each input from the player, and transmitting instructions to client system 730. As another example and not by way of limitation, each time player 701 provides an input to the game through the client system 730 (such as, for example, by typing on the keyboard or clicking the mouse of client system 730), the client components of the game may transmit the player's input to game management system 720b.

Storing Game-Related Data

A database may store any data relating to game play within a game management system 720b. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game management system 720b may determine the player's friend preferences based on player attributes that the player's first-degree friends have in common, and may store these player attributes as friend preferences in the player profile. Furthermore, the game management system 720b may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

Game Systems, Social Networks, and Social Graphs

In an online multiplayer game, players may control player characters (PCs), the game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 701 may access particular game instances of an online game. A game instance is copy of a specific game play area that is created during runtime. In particular embodiments, a game instance is a discrete game play area where one or more players 701 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 701 and one or more in-game objects controlled by the game engine. When accessing an online game, the game engine may allow player 701 to select a particular game instance to play from a plurality of game instances. Alternatively, the game engine may automatically select the game instance that player 701 will access. In particular embodiments, an online game comprises only one game instance that all players 701 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 720a or game management system 720b). In one embodiment, $N_{max}$ equals 7, such that the player's social network includes only first-degree friends. In another embodiment, $N_{max}$ is unlimited and the player's social network is coextensive with the social graph.

In particular embodiments, the social graph is managed by game management system 720b. In other embodiments, the social graph is part of a social networking system 720a managed by a third-party (e.g., Facebook, Friendster, Myspace), In yet other embodiments, player 701 has a social network on both game management system 720b and social networking system 720a, wherein player 701 can have a social network on the game management system 720b that is a subset, superset, or independent of the player's social network on social networking system 720a. In such combined systems, game network system 720b can maintain social graph information with edge type attributes that indicate whether a given friend is an "in-game friend," an "out-of-game friend," or both. The various embodiments disclosed herein are operable when the social graph is managed by social networking system 720a, game management system 720b, or both. Push notification activities disclosed herein may be performed with respect to either or both of an in-game friend network and an out-of-game friend network.

Figure 8:
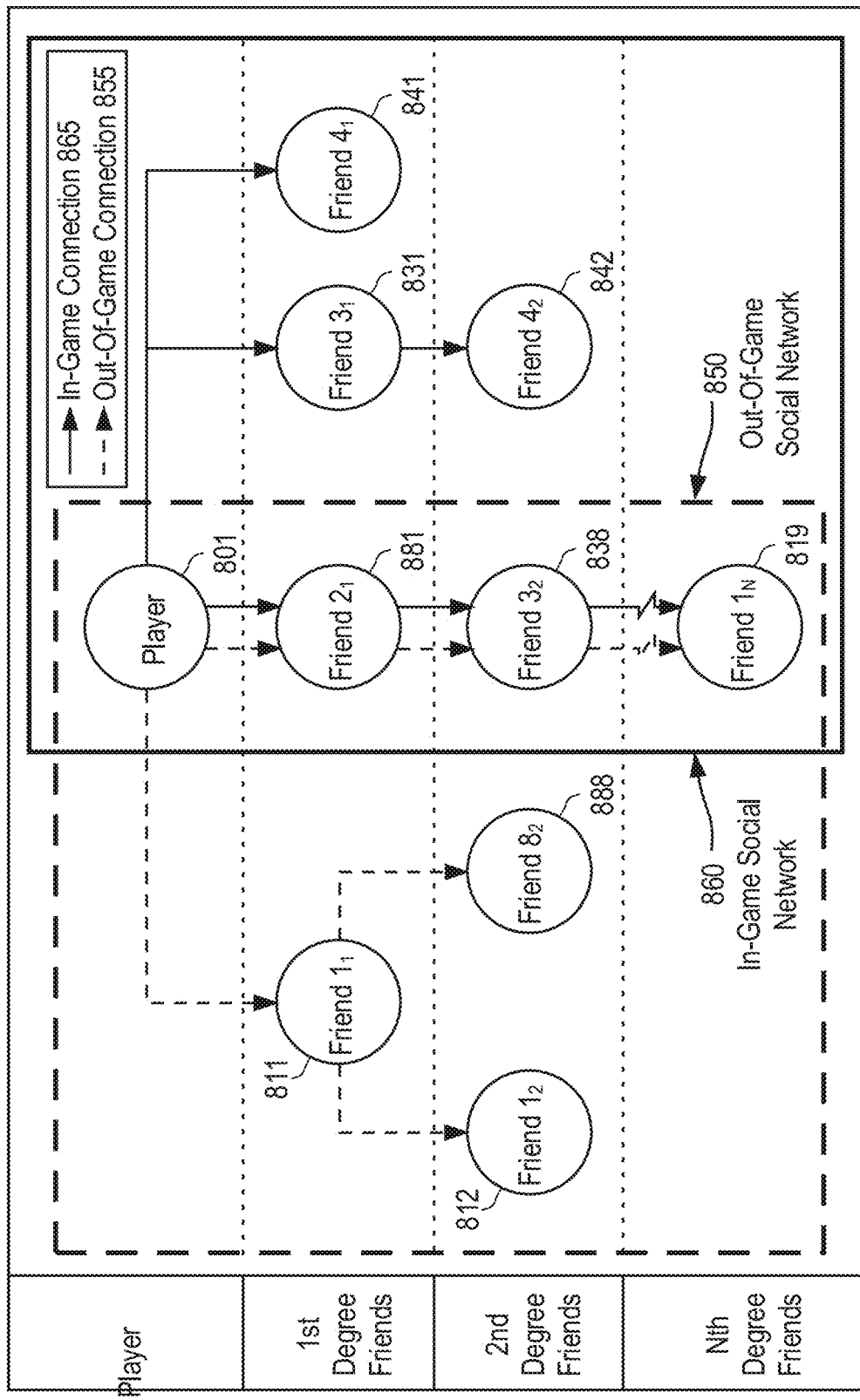
FIG. 8 is a schematic diagram showing an example of a social network within a social graph, according to some embodiments.

FIG. 8 shows an example of a social network within a social graph. As shown, Player 801 can be associated, connected or linked to various other users, or "friends," within the social network 850. These associations, connections or links can track relationships between users within the social network 850 and are commonly referred to as online "friends" or "friendships" between users. Each friend or friendship in a particular user's social network within a social graph is commonly referred to as a "node." For purposes of illustration and not by way of limitation, the details of social network 850 will be described in relation to Player 801. As used herein, the terms "player," "user" and "account" can be used interchangeably and can refer to any user or character in an online game management system or social networking system. As used herein, the term "friend" can mean any node within a player's social network.

As shown in FIG. 8, Player 801 has direct connections with several friends. When Player 801 has a direct connection with another individual, that connection is referred to as a first-degree friend. In social network 850, Player 801 has two first-degree friends. That is, Player 801 is directly connected to Friend $1_1$ 811 and Friend $2_1$ 821. In a social graph, it is possible for individuals to be connected to other individuals through their first-degree friends (i.e., friends of friends). As described above, each edge required to connect a player to another user is considered the degree of separation. For example, FIG. 8 shows that Player 801 has three second-degree friends to which he is connected via his connection to his first-degree friends. Second-degree Friend $1_2$ 812 and Friend $2_2$ 822 are connected to Player 801 via his first-degree Friend $1_1$ 811. The limit on the depth of friend connections, or the number of degrees of separation for associations, that Player 801 is allowed is typically dictated by the restrictions and policies implemented by social networking system 720a.

In various embodiments, Player 801 can have Nth-degree friends connected to him through a chain of intermediary degree friends as indicated in FIG. 8. For example, Nth-degree Friend $1_N$ 819 is connected to Player 801 via second-degree Friend $3_2$ 832 and one or more other higher-degree friends. Various embodiments may take advantage of and utilize the distinction between the various degrees of friendship relative to Player 801.

In particular embodiments, a player (or player character) can have a social graph within an online multiplayer game that is maintained by the game engine and another social graph maintained by a separate social networking system. FIG. 8 depicts an example of in-game social network 860 and out-of-game social network 850. In this example, Player 801 has out-of-game connections 855 to a plurality of friends, forming out-of-game social network 850. Here, Friend $1_1$ 811 and Friend $2_1$ 821 are first-degree friends with Player 801 in his out-of-game social network 850. Player 801 also has in-game connections 865 to a plurality of players, forming in-game social network 860. Here, Friend $2_1$ 821, Friend $3_1$ 831, and Friend $4_1$ 841 are first-degree friends with Player 801 in his in-game social network 860. In some embodiments, it is possible for a friend to be in both the out-of-game social network 850 and the in-game social network 860. Here, Friend $2_1$ 821 has both an out-of-game connection 855 and an in-game connection 865 with Player 801, such that $2_1$ 821 is in both Player 801's in-game social network 860 and Player 801's out-of-game social network 850.

As with other social networks, Player 801 can have second-degree and higher-degree friends in both his in-game and out of game social networks. In some embodiments, it is possible for Player 801 to have a friend connected to him both in his in-game and out-of-game social networks, wherein the friend is at different degrees of separation in each network. For example, if Friend $2_2$ 822 had a direct in-game connection with Player 801, Friend $2_2$ 822 would be a second-degree friend in Player 801's out-of-game social network, but a first-degree friend in Player 801's in-game social network. In particular embodiments, a game engine can access in-game social network 860, out-of-game social network 850, or both.

In particular embodiments, the connections in a player's in-game social network can be formed both explicitly (e.g., users must "friend" each other) and implicitly (e.g., system observes user behaviors and "friends" users to each other).

Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 9:
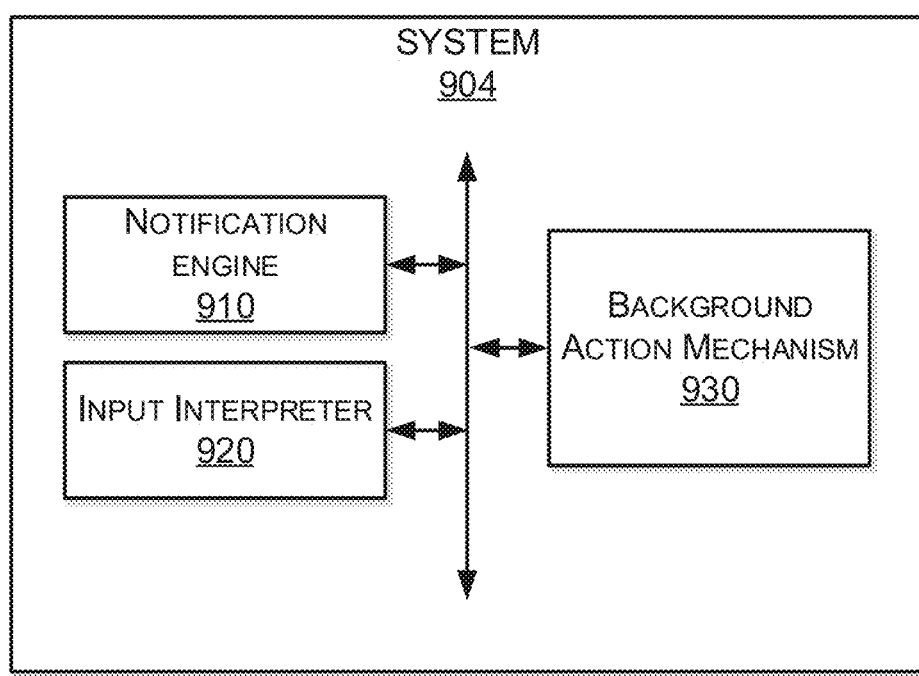
FIG. 9 is a block diagram illustrating components of a game management system, according to some example embodiments.

FIG. 9 shows a schematic view of an actionable notification system 904 that includes a number of hardware-implemented modules or arrangement for performing various automated procedures described with reference to the example embodiments of FIGS. 1-6. The functionalities of the system 904 and its respective components is briefly summarized immediately below. The various methodologies described herein are to be understood as being performed by use of the actionable notification system 904, thereby further to illustrate the configuration of system 904. As discussed previously, the actionable notification system 904 may in some embodiments be provided by a user device, such as the mobile phone 100. In other embodiments, the system 904 may be provided by server-site components, such as the example game management system 720b of FIG. 7. In a particular embodiment, the actionable notification system 904 forms part of the game management system 720b, being in communication with the game engine of the game management system 720b to receive information of game events that trigger actionable push notifications, and to prompt performance by the game engine of selected game actions responsive to user interaction with actionable push notifications surfaced on a user device (such as a mobile phone 100 of FIG. 1).

The system 904 includes a notification engine 910 for causing the presentation of actionable game-related push notifications (e.g., such as those described with reference to FIGS. 1-6) on a user device. The system 904 further includes an input interpreter 920 configured to receive and interpret input in the form of user-selection of a particular one of a plurality of game action elements forming part of respective push notifications.

The system 904 further includes a background action mechanism 930 configured to cause automated performance of a selected game-related action (e.g., such as those described with reference to FIGS. 1-6), without requiring launching of a corresponding game application and/or game user interface on the user device. In embodiments where the system 904 is provided by the user device, the background action mechanism 930 can be configured to cause performance of the selected game-related action by communicating the selected action to the online game engine, thereby to trigger automated implementation of the selected action by the game engine by modification of corresponding game state data. In embodiments where the system 904 is provided by one or more server-side device(s), the background action mechanism 930 may be configured to cause performance of the selected game action by implementing the selected action responsive to reception of a communication from the user device indicating selection of a particular game action element by the user.

The modules 910-930 are configured to communicate with each other (e.g., via a bus, shared memory, or a switch). Any one or more of the modules 910-930 described herein may be implemented using hardware (e.g., one or more processors of a machine) or a combination of hardware and software. For example, any module described herein may configure a processor (e.g., among one or more processors of a machine) to perform the operations described herein for that module. Thus, the modules may comprise circuitry formed dynamically by dynamic configuration of a reconfigurable processor through the execution of software code on the reconfigurable processor. Instead, or in addition, at least some of the modules may comprise permanently configured circuitry (e.g., an application specific integrated circuit) that is configured to perform the respective automated operations. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Data Flow

Figure 10:
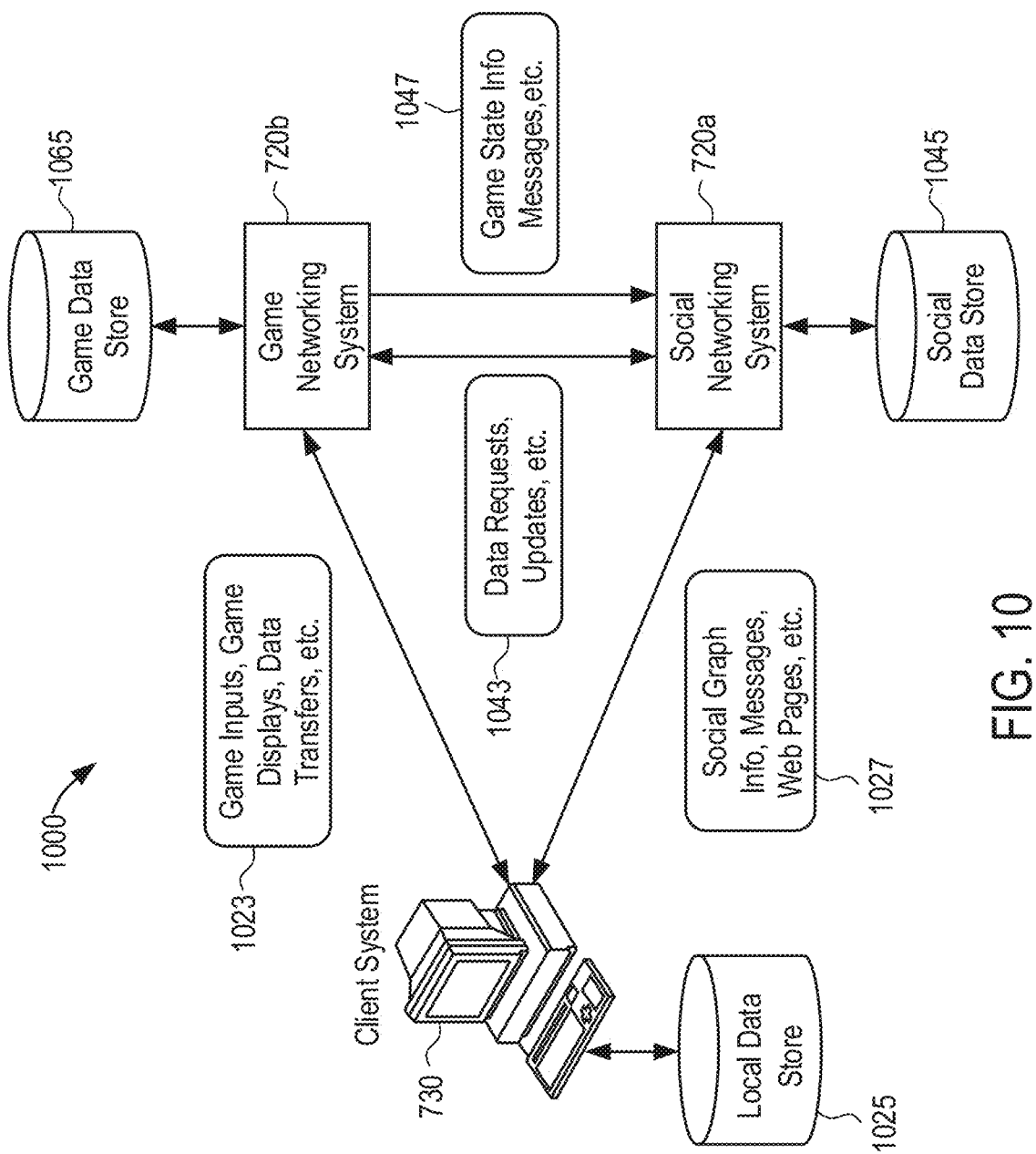
FIG. 10 is a diagrammatic representation of an example data flow between example components of the example system of FIG. 7, according to some example embodiments.

FIG. 10 illustrates an example data flow between the components of system 1000. In particular embodiments, system 1000 can include client system 730, social networking system 720a (i.e. social network system), and game management system 720b (i.e. online game system system). The components of system 1000 can be connected to each other in any suitable configuration, using any suitable type of connection. The components may be connected directly or over any suitable network. Client system 730, social networking system 720a, and game management system 720b can each have one or more corresponding data stores such as a local data store, social data store 1045, and game data store 1065, respectively. Social networking system 720a and game management system 720b can also have one or more servers that can communicate with client system 730 over an appropriate network. Social networking system 720a and game management system 720b can have, for example, one or more internet servers for communicating with client system 730 via the Internet. Similarly, social networking system 720a and game management system 720b can have one or more mobile servers for communicating with client system 730 via a mobile network (e.g., GSM, PCS, Wi-Fi, WPAN, etc.). In some embodiments, one server may be able to communicate with client system 730 over both the Internet and a mobile network. In other embodiments, separate servers can be used.

Client system 730 can receive and transmit data 1023 to and from game management system 720b. This data can include, for example, webpages, messages, game inputs, game displays, HTTP packets, data requests, transaction information, updates, and other suitable data. At some other time, or at the same time, game management system 720b can communicate data 1043, 1047 (e.g., game state information, game system account information, page info, messages, data requests, updates, etc.) with other networking systems, such as social networking system 720a (e.g., Facebook, Myspace, etc.). Client system 730 can also receive and transmit data 1027 to and from social networking system 720a. This data can include, for example, webpages, messages, social graph information, social network displays, HTTP packets, data requests, transaction information, updates, and other suitable data.

Communication between client system 730, social networking system 720a, and game management system 720b can occur over any appropriate electronic communication medium or network using any suitable communications protocols. For example, client system 730, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called. Binary Large Object (BLOB). When a player accesses an online game on game management system 720b, the BLOB containing the game state for the instance corresponding to the player can be transmitted to client system 730 for use by a client-side executed object to process. In particular embodiments, the client-side executable may be a FLASH-based game, which can de-serialize the game state data in the BLOB. As a player plays the game, the game logic implemented at client system 730 maintains and modifies the various game state parameters locally. The client-side game logic may also batch game events, such as mouse clicks, and transmit these events to game management system 720b. Game management system 720b may itself operate by retrieving a copy of the BLOB from a database or an intermediate memory cache (memcache) layer. Game management system 720b can also de-serialize the BLOB to resolve the game state parameters and execute its own game logic based on the events in the batch file of events transmitted by the client to synchronize the game state on the server side. Game management system 720b may then re-serialize the game state, now modified, into a BLOB and pass this to a memory cache layer for lazy updates to a persistent database.

With a client-server environment in which the online games may run, one server system, such as game management system 720b, may support multiple client systems 730. At any given time, there may be multiple players at multiple client systems 730 all playing the same online game. In practice, the number of players playing the same game at the same time may be very large. As the game progresses with each player, multiple players may provide different inputs to the online game at their respective client systems 730, and multiple client systems 730 may transmit multiple player inputs and/or game events to game management system 720*b* for further processing. In addition, multiple client systems 730 may transmit other types of application data to game management system 720*b*.

In particular embodiments, a computed-implemented game may be a text-based or turn-based game implemented as a series of web pages that are generated after a player selects one or more actions to perform. The web pages may be displayed in a browser client executed on client system 730. As an example and not by way of limitation, a client application downloaded to client system 730 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 720*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 730, either caused by an action of a game player or by the game logic itself, client system 730 may need to inform game management system 720*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 1000 is discussed in reference to updating a multi-player online game hosted on a network-addressable system (such as, for example, social networking system 720*a* or game management system 720*b*), where an instance of the online game is executed remotely on a client system 730, which then transmits application event data to the hosting system such that the remote game server synchronizes game state associated with the instance executed by the client system 730.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 730 may include a Flash client. The Flash client may be configured to receive and run Flash application or game object code from any suitable networking system (such as, for example, social networking system 720*a* or game management system 720*b*). In particular embodiments, the Flash client may be run in a browser client executed on client system 730. A player can interact with Flash objects using client system 730 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 730, the Flash client may send the events that caused the game state changes to the in-game object to game management system 720*b*. However, to expedite the processing and hence the speed of the overall gaming experience, the Flash client may collect a batch of some number of events or updates into a batch file. The number of events or updates may be determined by the Flash client dynamically or determined by game management system 720*b* based on server loads or other factors. For example, client system 730 may send a batch file to game management system 720*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 730. In particular embodiments, the batch file may be a text file and the name-value pairs may be in string format.

In particular embodiments, when a player plays an online game on client system 730, game management system 720*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game management system 720*b* may retrieve the corresponding BLOB from the database to determine the most-recent values of the game-related data. In particular embodiments, while a player is playing the online game, game management system 720*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 12:
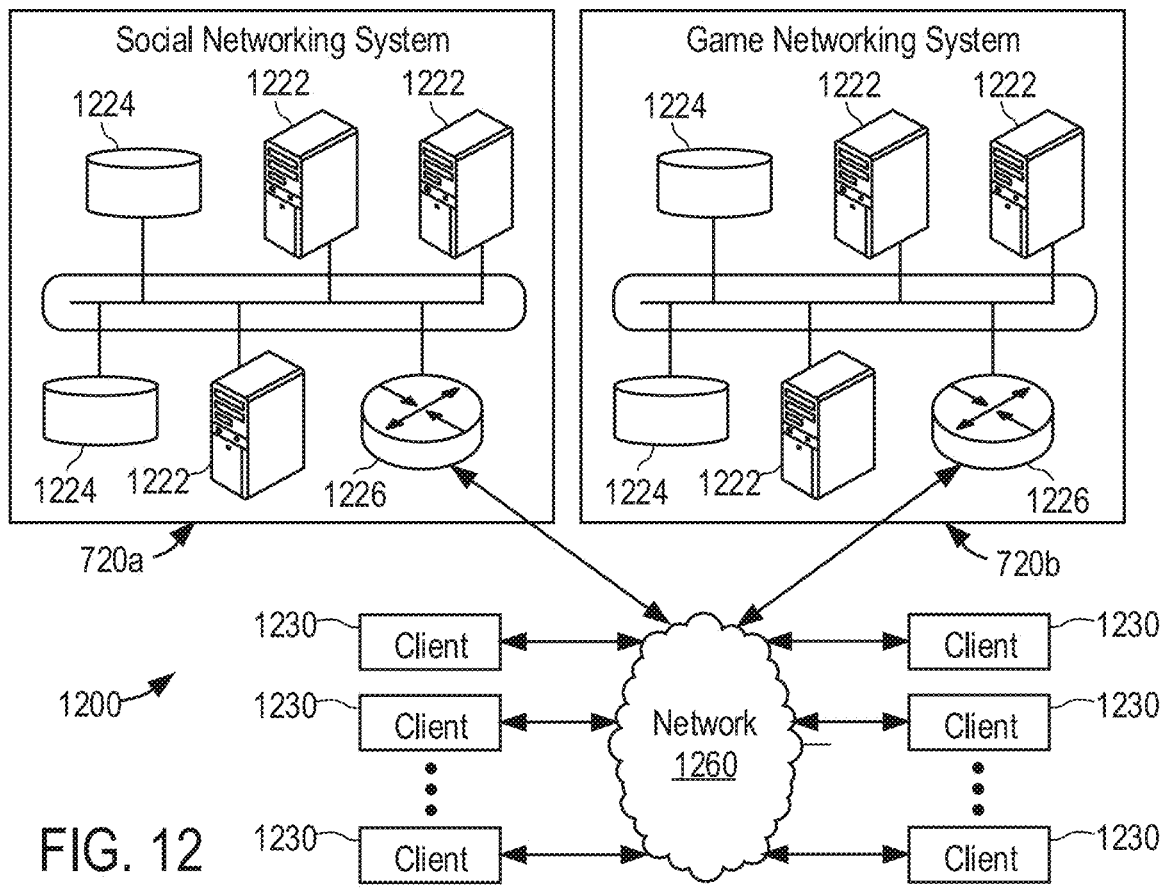
FIG. 12 illustrates an example network environment, in which various example embodiments may operate.
Figure 11:
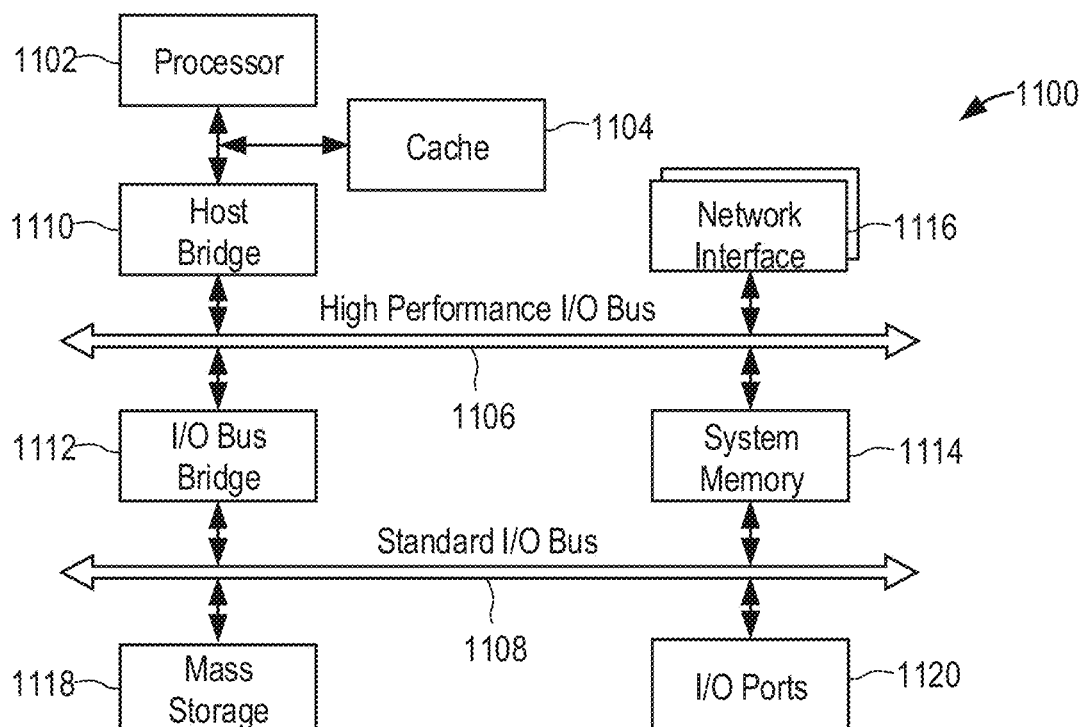
FIG. 11 illustrates an example computing system architecture, which may be used to implement a server or a client system illustrated in FIG. 12, according to some example embodiments.

FIG. 11 illustrates an example computing system architecture, which may be used to implement a server 1222 or a client system 730 illustrated in FIG. 12. In one embodiment, hardware system 1100 comprises a processor 1102, a cache memory 1104, and one or more executable modules and drivers, stored on a tangible computer readable medium, directed to the functions described herein. Additionally, hardware system 1100 may include a high performance input/output (I/O) bus 1106 and a standard I/O bus 1108. A host bridge 1110 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1100 may further include video memory (not shown) and a display device coupled to the video memory. Mass storage 1118 and I/O ports 1120 may couple to bus 1108. Hardware system 1100 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

The elements of hardware system 1100 are described in greater detail below. In particular, network interface 1116 provides communication between hardware system 1100 and any of a wide range of networks, such as an Ethernet (e.g., IEEE) network, a backplane, etc. Mass storage 1118 provides permanent storage for the data and programming instructions to perform the above-described functions implemented in servers 1222, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures and various components of hardware system 1100 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus.

Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 12 illustrates an example network environment, in which various example embodiments may operate. Network cloud 1260 generally represents one or more interconnected networks, over which the systems and hosts described herein can communicate. Network cloud 1260 may include packet-based wide area networks (such as the Internet), private networks, wireless networks, satellite networks, cellular networks, paging networks, and the like. As FIG. 12 illustrates, particular embodiments may operate in a network environment comprising one or more networking systems, such as social networking system 720a, game management system 720b, and one or more client systems 730. The components of social networking system 720a and game management system 720b operate analogously; as such, hereinafter they may be referred to simply at networking system 720. Client systems 730 are operably connected to the network environment via a network service provider, a wireless carrier, or any other suitable means.

Networking system 720 is a network addressable system that, in various example embodiments, comprises one or more physical servers 1222 and data stores 1224. The one or more physical servers 1222 are operably connected to computer network 1260 via, by way of example, a set of routers and/or networking switches 1226. In an example embodiment, the functionality hosted by the one or more physical servers 1222 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1222 may host functionality directed to the operations of networking system 720. Hereinafter servers 1222 may be referred to as server 1222, although server 1222 may include numerous servers hosting, for example, networking system 720, as well as other content distribution servers, data stores, and databases. Data store 1224 may store content and data relating to, and enabling, operation of networking system 720 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1224 corresponds to one or more of a variety of separate and integrated databases, such as relational databases and object-oriented databases, that maintain information as an integrated collection of logically related records or files stored on one or more physical systems. Structurally, data store 1224 may generally include one or more of a large class of data storage and management systems. In particular embodiments, data store 1224 may be implemented by any suitable physical system(s) including components, such as one or more database servers, mass storage media, media library systems, storage area networks, data storage clouds, and the like. In one example embodiment, data store 1224 includes one or more servers, databases (e.g., MySQL), and/or data warehouses. Data store 1224 may include data associated with different networking system 720 users and/or client systems 730.

Client system 730 is generally a computer or computing device including functionality for communicating (e.g., remotely) over a computer network. Client system 730 may be a desktop computer, laptop computer, personal digital assistant (PDA), in- or out-of-car navigation system, smart phone or other cellular or mobile phone, or mobile gaming device, among other suitable computing devices. Client system 730 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 730 to enter addresses of specific network resources to be retrieved, such as resources hosted by networking system 720. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 730 desires to view a particular webpage (hereinafter also referred to as target structured document) hosted by networking system 720, the user's web browser, or other document Sequence Generator or suitable client application, formulates and transmits a request to networking system 720. The request generally includes a URL or other document identifier as well as metadata or other information. By way of example, the request may include information identifying the user, such as a user ID, as well as information identifying or characterizing the web browser or operating system running on the user's client computing device 730. The request may also include location information identifying a geographic location of the user's client system or a logical network location of the user's client system. The request may also include a timestamp identifying when the request was transmitted.

Although the example network environment described above and illustrated in FIG. 12 described with respect to social networking system 720*a* and game management system 720*b*, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Although the above example embodiments described as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omni-directional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality Miscellaneous One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:
   causing locked mode-presentation on a mobile user device of an interactive notification about a computer-implemented online game of which a user associated with the mobile user device is a registered player, the locked mode-presentation comprising display of the interactive notification on a lockscreen that is presented when the mobile user device is in a locked mode, the interactive notification comprising:
      contextual information about a particular gameplay action performable by the user in an ongoing game instance; and
      an action trigger for the particular gameplay action, the action trigger being a user-selectable user interface element displayed as part of the interactive notification;
   receiving user input indicating selection of the action trigger; and
   automatically causing performance of the particular gameplay action responsive exclusively to the user input received via the interactive notification presentation on the lockscreen of the mobile user device.

2. The method of claim 1, wherein the particular gameplay action is performed without launching or accessing a game application that is installed on the mobile user device and that is executable to load game instances of the game in a game user interface on the mobile user device.

3. The method of claim 1, wherein the interactive notification comprises a plurality of action triggers for different respective gameplay actions, user selection of one of the plurality of action triggers triggering automated performance of the respective gameplay action corresponding to the selected action trigger.

4. The method of claim 3, wherein the plurality of action triggers are for mutually exclusive alternative options, so that no more than one of the plurality of action triggers are selectable responsive to locked mode-presentation of the interactive notification on the mobile user device.

5. The method of claim 1, wherein the locked mode-presentation of the interactive notification comprises display of the interactive notification via an interactive notification functionality commonly employed by multiple different applications on the mobile user device.

6. The method of claim 5, wherein the locked mode-presentation of the interactive notification is performed via a native notification functionality provided by an operating system of the mobile user device.

7. The method of claim 1, wherein the action trigger comprises a transfer trigger for transfer of in-game resources to a requesting player indicated in the contextual information, the particular gameplay action performed responsive to selection of the transfer trigger comprising deducting a specified quantum of a specified resource from a game state of the user, and adding the specified quantum of the specified resource to a game state of the requesting player.

8. The method of claim 1, wherein performance of the gameplay action causes change to a game state data for the user in the game instance.

9. The method of claim 8, wherein the gameplay action is with respect to a target game object within said ongoing game instance of the user, performance of the gameplay action resulting in modification of a gameplay state of the target game object.

10. The method of claim 9, wherein the gameplay action comprises triggering a harvest mechanic.

11. The method of claim 9, wherein the gameplay action comprises switching the target game object between an active mode and an inactive mode.

12. A system comprising:
   one or more computer processor devices; and memory storing instructions that, when executed by the one or more computer processor devices, configure the system to perform operations comprising:

causing locked mode-presentation on a mobile user device of an interactive notification about a computer-implemented online game of which a user associated with the mobile user device is a registered player, the locked mode-presentation comprising display of the interactive notification on a lockscreen that is presented when the mobile user device is in a locked mode, the interactive notification comprising:

contextual information about a particular gameplay action performable by the user in an ongoing game instance; and an action trigger for the particular gameplay action, the action trigger being a user-selectable user interface element displayed as part of the interactive notification;

receiving user input indicating selection of the action trigger; and automatically causing performance of the particular gameplay action responsive exclusively to the user input received via the interactive notification presentation on the lockscreen of the mobile user device.

13. The system of claim 12, wherein the instructions configure the system such that said maintaining of the mobile user device in the locked mode comprises de-surfacing the interactive notification without switching device display from the lockscreen.

14. The system of claim 12, wherein the interactive notification comprises a plurality of action triggers for different respective gameplay actions, user selection of one of the plurality of action triggers triggering automated performance of the respective gameplay action corresponding to the selected action trigger.

15. The system of claim 12, wherein the action trigger comprises a transfer trigger for transfer of in-game resources to a requesting player indicated in the contextual information, the particular gameplay action performed responsive to selection of the transfer trigger comprising deducting a specified quantum of a specified resource from a game state of the user, and adding the specified quantum of the specified resource to a game state of the requesting player.

16. The system of claim 12, wherein performance of the gameplay action causes change in game state data for the user in the game instance.

17. The system of claim 12, wherein the gameplay action is with respect to a target game object within said ongoing game instance, performance of the gameplay action resulting in modification of a gameplay state of the target game object.

18. A non-transitory computer-readable storage medium having stored thereon instructions that, when executed by a computer system, cause the computer system to perform operations comprising:

causing locked mode-presentation on a mobile user device of an interactive notification about a computer-implemented online game of which a user associated with the mobile user device is a registered player, the locked mode-presentation comprising display of the interactive notification on a lockscreen that is presented when the mobile user device is in a locked mode, the interactive notification comprising:

contextual information about a particular gameplay action performable by the user in an ongoing game instance; and an action trigger for the particular gameplay action, the action trigger being a user-selectable user interface element displayed as part of the interactive notification;

receiving user input indicating selection of the action trigger; and automatically causing performance of the particular gameplay action responsive exclusively to the user input received via the interactive notification presentation on the lockscreen of the mobile user device.

* * * * *